US009473312B2

(12) United States Patent
Winter et al.

(10) Patent No.: US 9,473,312 B2
(45) Date of Patent: Oct. 18, 2016

(54) WAKE ON APPLICATION

(71) Applicant: Dell Products, L.P., Round Rock, TX (US)

(72) Inventors: Robert Winter, Burnet, TX (US); Robert Hormuth, Cedar Park, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 294 days.

(21) Appl. No.: 14/020,578

(22) Filed: Sep. 6, 2013

(65) Prior Publication Data

US 2015/0074432 A1  Mar. 12, 2015

(51) Int. Cl.
*G06F 1/32* (2006.01)
*H04L 12/12* (2006.01)

(52) U.S. Cl.
CPC .............. *H04L 12/12* (2013.01); *G06F 1/3209* (2013.01); *Y02B 60/34* (2013.01); *Y02B 60/35* (2013.01)

(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| 6,697,383 | B1* | 2/2004 | Li | H04L 7/042 |
| | | | | 370/472 |
| 7,865,752 | B2* | 1/2011 | Brabenac | H04L 43/028 |
| | | | | 713/323 |
| 8,918,473 | B1* | 12/2014 | O'Connor | H04L 67/02 |
| | | | | 709/206 |
| 8,943,569 | B1* | 1/2015 | Luckett, Jr. | 463/25 |
| 2006/0168087 | A1* | 7/2006 | Lescuyer | H04L 12/581 |
| | | | | 709/207 |
| 2007/0094708 | A1* | 4/2007 | Hess | H04L 63/0861 |
| | | | | 726/2 |
| 2007/0101407 | A1* | 5/2007 | Cheung | H04L 63/0884 |
| | | | | 726/4 |
| 2008/0141015 | A1* | 6/2008 | Chalemin | G06F 9/4416 |
| | | | | 713/2 |
| 2009/0310607 | A1* | 12/2009 | Evans | 370/389 |
| 2010/0240398 | A1* | 9/2010 | Hotes | H04L 63/102 |
| | | | | 455/456.2 |
| 2012/0331311 | A1* | 12/2012 | Jai | G06F 1/266 |
| | | | | 713/300 |
| 2013/0024706 | A1* | 1/2013 | Katar | H04L 12/12 |
| | | | | 713/321 |
| 2013/0089015 | A1* | 4/2013 | Choong | H04W 52/0216 |
| | | | | 370/311 |
| 2013/0179928 | A1* | 7/2013 | Nagata et al. | 725/81 |
| 2013/0205153 | A1* | 8/2013 | Yokoyama | 713/323 |
| 2014/0040120 | A1* | 2/2014 | Cho et al. | 705/39 |
| 2014/0195839 | A1* | 7/2014 | Chueh | G06F 1/329 |
| | | | | 713/323 |
| 2014/0208132 | A1* | 7/2014 | Cheston | G06F 1/26 |
| | | | | 713/310 |
| 2014/0359141 | A1* | 12/2014 | Inoue | H04L 65/1006 |
| | | | | 709/227 |
| 2014/0359167 | A1* | 12/2014 | Balasubramanian | H04L 29/06095 |
| | | | | 709/250 |
| 2015/0149994 | A1* | 5/2015 | Adachihara et al. | 717/178 |
| 2015/0237658 | A1* | 8/2015 | Fontaine | H04W 76/02 |
| | | | | 370/311 |

* cited by examiner

*Primary Examiner* — Thomas Lee
*Assistant Examiner* — Mohammad A Rahman
(74) *Attorney, Agent, or Firm* — Fogarty, L.L.C.

(57) ABSTRACT

Systems and methods for "Wake on Application" (WOA). An Information Handling System (IHS) may include a logic circuit and a memory having instructions that, upon execution, cause the IHS to: receive a WOA packet while the IHS is in a first power state, where the WOA packet identifies at least one of a software application or virtual server residing within the IHS; and, in response to having received the WOA packet, operate in a second power state and launch the software application or wake up the virtual server. A method may include originating, via a first IHS, a single WOA packet; and transmitting the single WOA packet over a network, where the single WOA packet is configured to cause a second IHS to switch operation from a first power state to a second power state, and to launch a software application or wake up a virtual server.

12 Claims, 3 Drawing Sheets

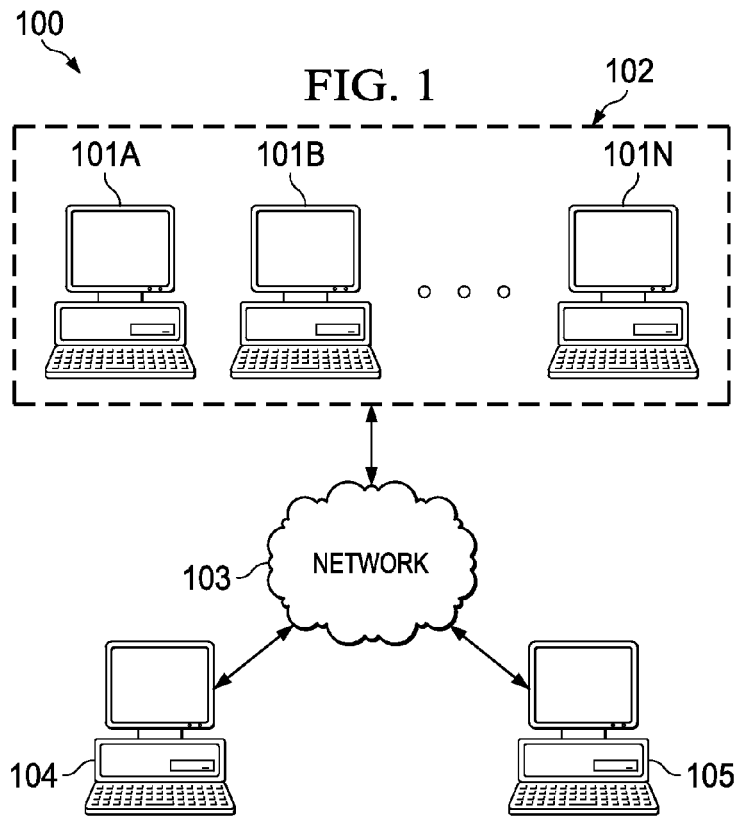
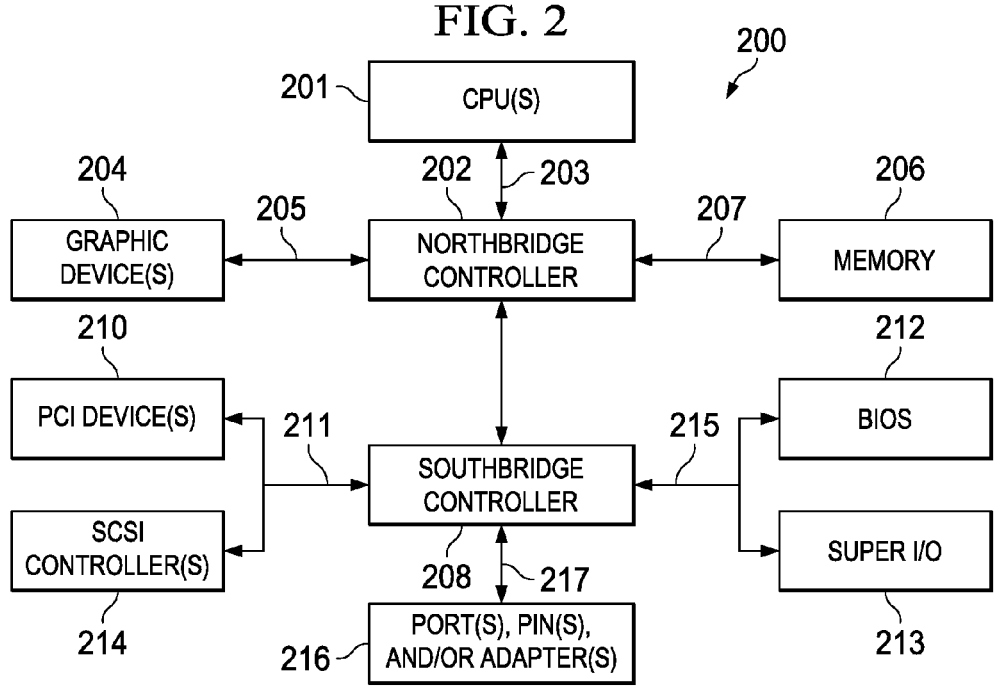

WAKE ON APPLICATION

FIELD

This disclosure relates generally to computer systems, and more specifically, to systems and methods for Wake on Application (WOA).

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Often two or more IHSs may be connected to together to form networks, and certain IHSs may have "Wake on LAN" (WOL) capabilities. Generally speaking, WOL is a networking standard that allows an IHS to be remotely turned on or awakened by receiving a network message that is originated by another IHS. The WOL message is usually sent by the other IHS on the same Local Area Network (LAN); although it is also possible to originate the message from another network outside the LAN.

SUMMARY

Embodiments of systems and methods for "Wake on Application" (WOA) are described herein. In an illustrative, non-limiting embodiment, an Information Handling System (IHS) may include a logic circuit; and a memory coupled to the logic circuit, the memory including program instructions stored thereon that, upon execution by the logic circuit, cause the IHS to: receive a Wake on Application (WOA) packet while the IHS is in a first power state, where the WOA packet identifies at least one of a software application or virtual server, the software application or virtual server residing within the IHS; and in response to having received the WOA packet, operate in a second power state and perform at least one of: (i) launch the software application, or (ii) wake up the virtual server.

In some implementations, the logic circuit may include at least one of: a Basic Input/Output System (BIOS) or a Network Interface Card (NIC) controller. The WOA packet may be received over a computer network. And the second power state may consume more power than the first power state.

For example, the WOA packet may include a Wake on LAN (WOL) string followed by one or more instances of a Media Access Control (MAC) address associated with the IHS. The WOA packet may include a WOA string following the one or more instances of the MAC address. The WOA packet may also include, following the WOA string, an identification of at least one of: (i) the software application, or (ii) the virtual server. The WOA string may include a public encryption key, and the program instructions, upon execution by the logic circuit, may further cause the IHS use the public encryption key to decode the identification. Also, the identification may be selected from the group consisting of: an Internet Protocol (IP) address, a virtual MAC address, and a global application tag.

In some cases, the WOA packet may include, following the identification of the at least one of: (i) the software application, or (ii) the virtual server, an identification of a receiving software application or virtual server, and the program instructions, upon execution by the logic circuit, may further cause the IHS to initiate a communication with the receiving software application or virtual server. The receiving software application or virtual server may reside in an originating IHS distinct from the IHS, the originating IHS having originated the WOA packet. Additionally or alternatively, the receiving software application or virtual server may reside in another IHS distinct from the IHS, and the other IHS may be distinct from the IHS and from an originating IHS, the originating IHS having originated the WOA packet.

In another illustrative, non-limiting embodiment, a method may include originating, via a first IHS, a single WOA packet; and transmitting the single WOA packet over a network, where the single WOA packet is configured to cause a second IHS to switch operation from a first power state to a second power state and to perform at least one of: (i) launch a software application, or (ii) wake up a virtual server, the software application or virtual server residing within the second IHS.

In some implementations, the single WOA packet may include a Wake on LAN (WOL) string followed by one or more instances of a Media Access Control (MAC) address associated with the second IHS. The WOA packet may include a WOA string following the one or more instances of the MAC address. The WOA packet may include, following the WOA string, an identification of at least one of: (i) the software application, or (ii) the virtual server. The identification may be selected from the group consisting of: an Internet Protocol (IP) address, a virtual MAC address, and a global application tag.

Moreover, the single WOA packet may include, following the identification of the at least one of: (i) the software application, or (ii) the virtual server, an identification of a receiving software application or virtual server residing in any IHS other than the second IHS, and the single WOA packet may be further configured to cause the second IHS to initiate a communication with the receiving software application or virtual server.

In yet another illustrative, non-limiting embodiment, a non-transitory computer-readable medium may have program instructions stored thereon that, upon execution by an IHS, cause the IHS to: receive a single WOA frame while the IHS operates in a first power state, where the single WOA frame identifies a software application or virtual server residing within the IHS, and where the single WOA frame includes: (i) a Wake on LAN (WOL) string followed by one or more instances of a Media Access Control (MAC) address associated with the IHS, (ii) a WOA string following the one or more instances of the MAC address, and (iii) an identification of the software application or virtual server selected from the group consisting of: an Internet Protocol (IP) address, a virtual MAC address, and a global application tag; and, in response to having received the WOA packet, operate in a second power state and perform at least one of: (i) launch the software application, or (ii) wake up the virtual server.

The single WOA frame may include, following the identification of the software application or virtual server, an identification of a receiving software application or virtual server residing in another IHS other than the IHS, and the program instructions, upon execution by the IHS, may further cause the identified software application or virtual server to communicate with the receiving software application or virtual server.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 1 is a diagram illustrating an example of an environment where systems and methods for Wake on Application (WOA) may be implemented according to some embodiments.

FIG. 2 is a block diagram of an example of an Information Handling System (IHS) according to some embodiments.

DETAILED DESCRIPTION

Figure 3:
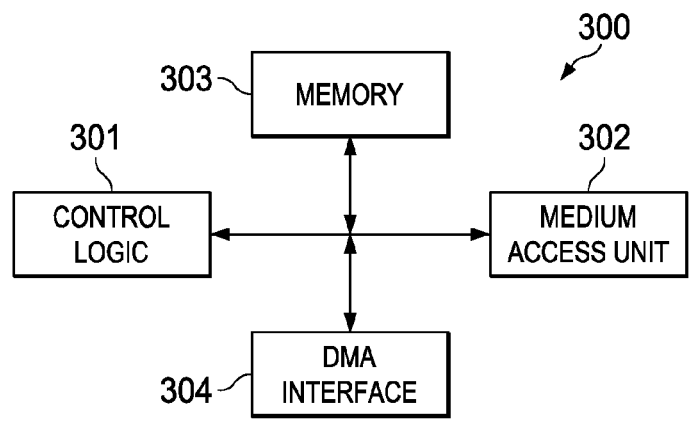
FIG. 3 is a block diagram of an example of a Network Interface Controller (NIC) according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail in FIG. 2.

The "Wake on LAN" (WOL) standard provides a mechanism whereby a "magic packet," when received by a target IHS over a network, causes that target IHS to "wake" or be turned on, if currently in a dormant or power conserving mode. A "magic packet" is a broadcast frame containing anywhere within its payload 6 bytes of all 255 ("FF FF FF FF FF FF" in hexadecimal), followed by sixteen repetitions of the target IHS's 48-bit MAC address, for a total of 102 bytes. Because the magic packet is only scanned for such a string, and not actually parsed by a full protocol stack, it may be sent as any network or transport-layer protocol, although it is typically sent as a User Datagram Protocol (UDP) frame to ports 7 or 9, or directly over Ethernet as EtherType 0x0842. Generally speaking, the WOL implementation is designed to be simple and quickly processed by circuitry present on a Network Interface Card (NIC) or the target IHS with minimal power requirements.

Accordingly, as the inventors hereof have recognized, WOL is not application targeted (e.g., it does not "spin up" applications). To address these, and other concerns, embodiments of the systems and methods described herein allow not only simply waking a target IHS but, at the same time, initiating a higher layer protocol connection to transfer data between cooperating applications. This enables a higher level of intelligence in the "wake" mechanism in single frame reception.

Many situations occur when a specific application, either hosted on a protocol capable network adapter or a standard host, needs to be awoken. The wake process then involves not only turning on the power to the platform but also bringing up a specific application or applications, initiating connections and transferring data. This one step application-oriented wake mechanism is particularly well suited to offloaded adapter cards or otherwise TCP capable embedded devices as well as standard servers.

In some embodiments, the system and methods for "Wake On Application" (WOA) described herein do not interfere with the normal operation of the WOL mechanism. Rather, a "to-be-awoken" IHS node may be WOA aware; the node may parse a WOA packet further into the data field to extract the appropriate information. The WOA then contains additional data (that is, in addition to WOL data), that is specific and recognizable to WOA capable nodes.

For example, in the context of TCP, a WOA-aware IHS may receive a single WOA packet, which may be first recognized as a standard magic packet. The IHS inspects the magic packet, finding the pattern "OxFFFFFFFFFFFF" and the 16 copies of the MAC address. If the MAC address is the IHS's MAC, then the IHS further searches for a WOA unique pattern, immediately after the 16 copies of the MAC address. As a simple example, the WOA pattern may be "0x0BADBEEFBADBEEFBADBEEFBADBEEF." If this WOA pattern is found, then the IHS may check the IP node address that may be provided immediately after this pattern. If the IP node address represents the IHS's IP node address, then the IHS further checks for an IP destination address immediately after the IP source address to find an IP target to connect to for the awoken application. The IHS then retrieves the TCP node port to open for the application.

In sum, a WOA-aware IHS, when targeted by a WOA packet, may retrieve all the information required to set up a TCP/IP connection to the application requesting a wakeup call on a remote node from the WOA packet itself. The IP route may be determined and TCP connection established using these parameters. Upon successful application awaken, information transfer may take place.

Moreover, these systems and methods are applicable for both physical and virtual servers. In particular, a virtual server may be "awoken" or launched using WOA mechanisms. This is particularly useful in a "virtual machine sea" within a rack. Instead of all virtual machines being on all the time with all their dedicated applications also running all the time, the WOA mechanism enables an intelligent application-based scheme to dynamically use application resources only when needed, and facilitates dynamic application resource usage. In fact, the WOA mechanism may be used during power up to selectively launch applications from time to time. The applications may then go dormant, along with an entire server, until the next WOA packet is received.

In some implementations, the systems and methods described herein may make use of the Transmission Control Protocol (TCP), which is currently one of the core protocols of the Internet protocol suite (IP). It should be understood, however, that these systems and methods are not limited to TCP protocol, and may be used with any other suitable protocol.

To further illustrate the foregoing, FIG. 1 is a diagram illustrating an example of environment 100 where WOA systems and methods may be implemented according to some embodiments. As shown, a plurality of IHSs 101A-N are located in the same Local Area Network (LAN) 102. For example, LAN 102 may include a Storage Area Network (SAN), a Personal Area Network (PAN), a Wireless Local Area Network (WLAN), or the like.

One or more of IHSs 101A-N may have access to other IHSs 104 and/or 105 located outside of LAN 102 via network 103. Network 103 may be any suitable network implemented as, or may part of, a Wide Area Network (WAN), a Metropolitan Area Network (MAN), a Virtual Private Network (VPN), an intranet, the Internet, or any other appropriate architecture or system that facilitates the communication of signals, data and/or messages.

Communications among the various IHSs shown in FIG. 1 may be achieved using well-known network devices (not shown) including, for example, routers, access points, switches, etc. Other network devices such as gateways, firewalls, etc. are also omitted for sake of simplicity.

Within environment 100, a number of different scenarios arise where WOA mechanisms may be employed. For example, within LAN 102, IHS 101A may send a WOA packet to IHS 101B instructing HIS 101B to wake and exchange data with IHS 101A. Additionally or alternatively, IHS 101A may send a WOA packet to IHS 101B instructing IHS 101B to wake up and exchange data with IHS 101N, also within LAN 102. Additionally or alternatively, IHS 101A may send a WOA packet to IHS 101B instructing IHS 101B to wake up and exchange data with IHS 104, which is outside of LAN 102.

In other cases, IHS 104 external to LAN 102 may send a WOA packet to IHS 101B within LAN 102 directing IHS 101B to exchange information with IHS 101N. Additionally or alternatively, IHS 104 may send a WOA packet to IHS 101B directing it to communicate with IHS 104. Additionally or alternatively, IHS 104 may send a WOA packet to IHS 101B directing it to communicate with IHS 105, which is other than IHS 104 and is also outside of LAN 102.

In other cases, the same IHS may send two or more WOA packets targeting different IHSs such that those two or more IHSs are awoken and begin communicating with one another. One or more of these IHSs may be within LAN 102 and/or one or more other ones of these IHSs may be outside of LAN 102. For example, IHS 104 may send a first WOA packet targeting IHS 101B and a second WOA packet targeting IHS 105. After receiving their respective WOA packets, IHS 101B and IHS 105 may each wake up and launch a same (or different) respective applications or virtual servers, and those applications or virtual servers may begin communicating with one another.

Although illustrated in FIG. 1 as distinct, physical devices, it should be noted that, in some embodiments, one or more of IHSs 101A-N, 104, or 105 may be virtual machines. For instance, in some cases, two or more of IHSs 101A-N may be virtual servers running on the same server blade or the like.

FIG. 2 is a block diagram of an example of an IHS 200. In some embodiments, HIS 200 may be used to implement any of IHSs 101A-N, 104, or 105. As shown, IHS 200 includes one or more CPUs 201. In various embodiments, IHS 200 may be a single-processor system including one CPU 201, or a multi-processor system including two or more CPUs 201 (e.g., two, four, eight, or any other suitable number). CPU(s) 201 may include any processor capable of executing program instructions. For example, in various embodiments, CPU(s) 201 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

CPU(s) 201 are coupled to northbridge controller or chipset 201 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors, etc.) via graphics bus 205 (e.g., an Accelerated Graphics Port or AGP bus, a Peripheral Component Interconnect or PCI bus, etc.). Northbridge controller 202 is also coupled to system memory 206 via memory bus 207. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial, parallel, Ethernet, etc., via port(s), pin(s), and/or adapter(s) 216 over bus 217. For example, southbridge controller 208 may be configured to allow data to be exchanged between IHS 200 and other devices, such as other IHSs attached to a network. In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 100 through a wired or wireless connection. As shown, southbridge controller 208 is further coupled to one or more PCI devices 210 (e.g., modems, network cards, sound cards, video cards, etc.) and to one or more SCSI controllers 214 (e.g., SAS controllers 700) via parallel bus 211. Southbridge controller 208 is also coupled to Basic I/O System (BIOS) 212 and to Super I/O Controller 213 via Low Pin Count (LPC) bus 215.

BIOS 212 includes non-volatile memory having program instructions stored thereon. Those instructions may be usable CPU(s) 201 to initialize and test other hardware components and/or to load an Operating System (OS) onto IHS 200. Super I/O Controller 213 combines interfaces for a variety of lower bandwidth or low data rate devices. Those devices may include, for example, floppy disks, parallel ports, keyboard and mouse, temperature sensor and fan speed monitoring/control, etc.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be added. Accordingly, systems and methods described herein may be implemented or executed with other IHS configurations.

The overall power consumption of IHS 200 can be categorized into "power states." For example, the Advanced Configuration and Power Interface (ACPI) specification provides a standard for device configuration and power management that defines a total of six different power states ranging from "S0," when IHS 200 is completely powered on and fully operational to "S5," when IHS 200 is completely powered off. Intermediate states "S1," "S2," "S3," and "S4" are referred to as sleeping states. During these sleeping states, IHS 200 may appear to a human user to be off, but may retain enough of its hardware context (e.g., registers, memory caches, RAM, etc.) to return to the working state without rebooting.

Particularly, in the S1 state, IHS 200 consumes less power than S0 state; yet all hardware and processor context is maintained. In the S2 state, IHS 200 consumes less power than S1 state. CPU(s) 201 lose power and processor context, and contents of its cache may be lost. In the S3 state IHS 200 consumes less power than in the S2 state. CPU(s) 201's context, cache contents, and chipset 202/208's context may be lost; but system memory 206 is retained. In the S4 state, also known as "hibernation," IHS 200 consumes the least power compared to all other sleep states. IHS 200 is almost at an off state, expect for a trickle power. Context data is written to a hard drive, and there is no context retained. Note that in power state S4, IHS 200 can restart from context data stored on a hard disk, but in S5 IHS 200 requires a reboot.

With respect to transitions between states, it is noted that IHS 200 is "waking up" when transitioning from the off state S5 or any sleep state S1-S4 to the on state S0. Conversely, IHS 200 is said to be going to "sleep" when transitioning from on state S0 to the off state S5 or any sleep state S1-S4. Typically, IHS 200 does not enter one sleep state directly from another; rather it enters the on state S0 before entering any other sleep state.

FIG. 3 is a block diagram of an example of Network Interface Controller (NIC) 300. In some embodiments, NIC 300 may be implemented within southbridge controller 208. Alternatively, NIC 300 may be coupled to HIS 200 via any other suitable connection or bus. As depicted here, NIC 300 may include logic control circuitry 301, Medium Access Control (MAC) unit 302, local NIC memory 303, and Direct Memory Access (DMA) interface unit 304.

Logic control circuitry 301 may be provided as a System-On-Chip (SoC), an Application Specific Integrated Circuit (ASIC), or the like. In the case of a programmable NIC 300, control logic circuitry 301 may include one or more programmable processors that run compiled-code firmware. DMA interface unit 304 is directed by control logic 301 to read and write data between local NIC memory 303 and IHS 200's memory 206. Medium access unit 302 interacts with control logic 301 to receive frames into local buffer storage and to send frames from local buffer storage out onto a network (e.g., LAN 102). Memory 303 may be used, for example, for temporary storage of packets, frames, buffer descriptors, and/or other data.

Figure 4:
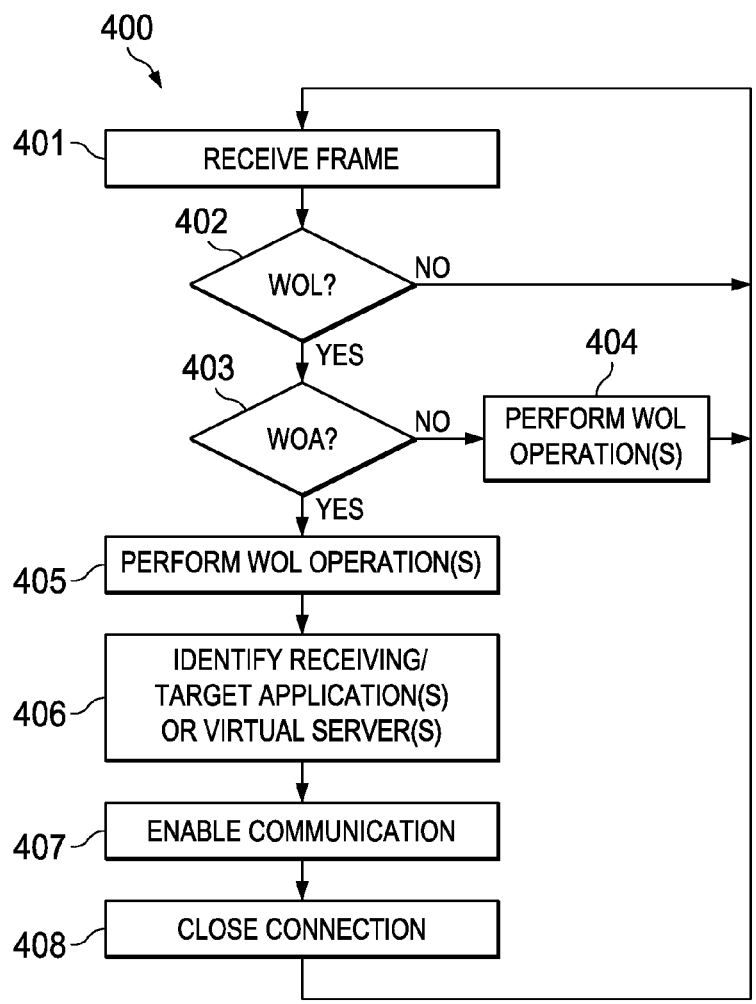
FIG. 4 is a flowchart of an example of a method for WOA according to some embodiments.

FIG. 4 is a flowchart of an example of WOA method 400. In some embodiments, method 400 may be performed, at least in part, by NIC 300 and/or BIOS 212 of IHS 200. Additionally or alternatively, at least a portion of method 400 may be performed by CPU(s) 201. It is assumed that, prior to method 400 being performed, IHS 200 is operating in a first, lower power state (e.g., S1 through S5).

At block 401, method 400 includes receiving a packet or frame. At block 402, method 400 includes determining whether the received packet or frame is a WOL frame, also known as a magic packet. For example, IHS 200 may seek to identify a WOL tag or pattern followed by 16 copies of a MAC address. If the pattern is found, and if the MAC address is the IHS's own MAC, then method 400 proceeds to block 403. Otherwise, method 400 returns to block 401.

At block 403, method 400 includes determining whether the received frame or packet is a WOA packet. For instance, IHS 200 may further search the packet or frame for a WOA unique tag or pattern, immediately after the 16 copies of the MAC address. Regardless of whether the WOA tag is found, either at blocks 404 or 405 WOL operations may be performed. Specifically, IHS 200 may transition from the first, lower power state (e.g., S1 through S5) to a second, higher power state (e.g., S0). If the WOA tag is found, however, control passes to block 406. Otherwise control returns to block 401 (or method 400 ends).

At block 406, method 400 includes recognizing, within the received frame or packet, an identification of a receiving application, a receiving virtual machine or server, a target IHS, a target application, and/or a target virtual machine or server. For example, IHS 200 may determine which application or virtual server is to be awoken by the received packet by attempting to match the recognized identification(s) with IDs stored in local memory (e.g., memory 303). The local memory may include a table correlating each available application or virtual server residing within IHS 200 with a distinct identification string. Examples of identification include, but are not limited to, Internet Protocol (IP) addresses, MAC addresses, virtual MAC addresses, and global application tag (strings that uniquely identify software applications).

For example, in the context of TCP, IHS 200 may recognize an IP source address following the WOA tag. IHS 200 may then check for an IP destination address immediately after the IP source address to find an IP target to connect to for the awoken application. IHS 200 may then retrieve a TCP node port to open for the application.

At block 407, method 400 includes enabling communications between the source application/virtual server and the target application/virtual server. For example, IHS 200 may launch a software application or wake up a virtual server. After the communication ends, the connection may be closed at block 408 and control returns to block 401. Importantly, in the foregoing example, the entire communication was set up using a single magic packet. In other words, all parameters necessary for establishing the communications between source and target applications or virtual servers may be provided in a single WOA packet.

In some cases, the WOA packet may have been sent by an IHS hosting the source application or virtual server, the receiving IHS may include the receiving application or virtual server. In other cases, the receiving software application or virtual server may reside in a third IHS; that is, another IHS distinct from the IHS that originated the WOA packet and also distinct from the IHS that received the WOA packet. For example, a given IHS may cause communications to be initiated between two other IHSs operating in standby mode by sending a first WOA packet directed to a first IHS and a second WOA packet directed to a second IHS. Similarly, the given IHS may cause communications to be initiated between two virtual servers or applications in the same physical IHSs.

In some embodiments, the WOA tag identified in block 403 may include a public encryption key or the like. In that case, a portion of the WOA packet may be encrypted using public-key cryptography, and block 406 may include decoding the application and/or virtual server identifiers using a private key matching the WOA tag's public key.

Figure 5:
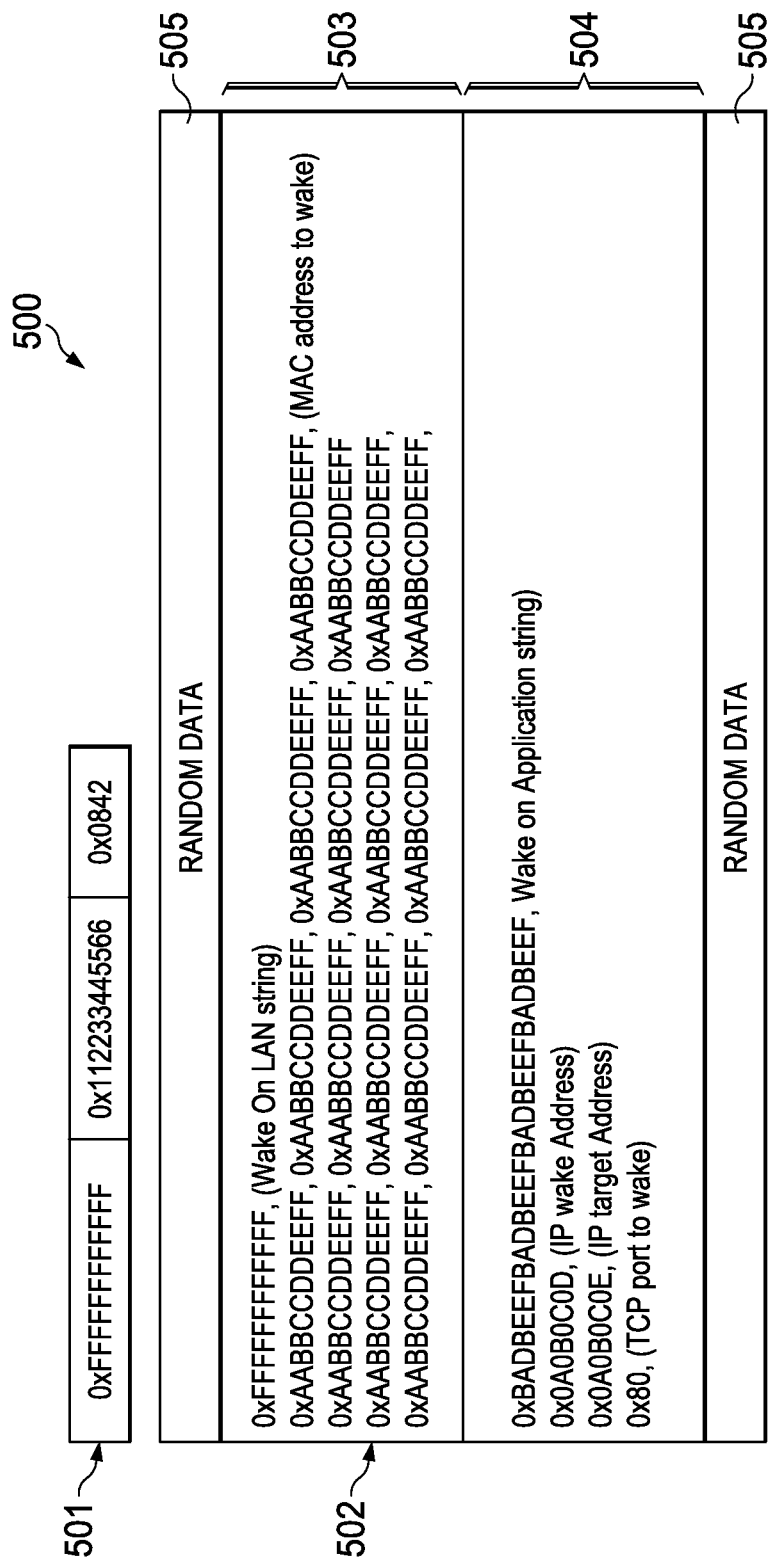
FIG. 5 is a diagram of an example of a WOA packet or frame according to some embodiments.

FIG. 5 is a diagram of an example of WOA packet or frame 500. In some embodiments, WOA frame 500 may be assembled by IHS 200 and transmitted over a network to another IHS operating in a low power state. As illustrated, WOA packet 500 includes header portion 501 (0xFFFFFFFFFFFF; 0x112233445599; 0x0842) and payload portion 502 with random data 505 in between, as well as following payload 502. Payload 502 is further subdivided into WOL portion 503 and WOA portion 504. Particularly, WOL portion 503 includes a WOL string 501 (6 bytes; "0xFFFFFFFFFFFF") followed by a number of repetitions of MAC address 502 (6 bytes each; "0xAABBCCDDE-EFF"). Again, the MAC address within WOL portion 503 is the MAC address of the IHS to be woken up. In this case, there are 16 repetitions of MAC address to wake, thus resulting in a total of 102 bytes. WOL portion 503 and its 102 bytes are part of magic packet defined by the WOL standard.

In this example, after WOL portion 503 of WOA packet 500, WOA portion 504 includes a WOA string ("0xBAD-BEEFBADBEEFBADBEEFBADBEEF"), an IP wake address (that is, an identification of an application or virtual server within the receiving IHS to be woken up; "0x0A0B0C0D"), an IP target address (that is, an identification of an application or virtual server within the transmitting IHS, or some other IHS, with which the awoken application or server is to communicate; "0x0A0B0C0E"), and a TCP port to wake (a port through which to establish communications between the receiving IHS and the transmitting IHS, or some other IHS; "0x80").

More generally, however, WOA portion 504 may include other fields. For example, as noted previously, WOA portion 504 may include any application or virtual machine identification (e.g., a virtual MAC address, a global application tag, etc.), and as such it is not limited to IP addresses and TCP ports.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a logic circuit; and
a memory coupled to the logic circuit, the memory including program instructions stored thereon that, upon execution by the logic circuit, cause the IHS to:
receive a single Wake on Application (WOA) frame while the IHS operates in a first power state, wherein the single WOA frame identifies a software application residing within the IHS, and wherein the single WOA frame includes: (i) a Wake on LAN (WOL) string followed by one or more instances of a Media Access Control (MAC) address associated with the IHS, (ii) a WOA string following the one or more instances of the MAC address, (iii) an identification of the software application selected from the group consisting of: an Internet Protocol (IP) address, a virtual MAC address, and a global application tag, (iv) an identification of a receiving software application residing in another IHS other than the IHS to communicate with the identified software application, and (v) an identification of a port through which the identified software application is to establish communications with the receiving software application; and
in response to having received the WOA packet, operate in a second power state and launch the software application.

2. The IHS of claim 1, wherein the logic circuit includes at least one of: a Basic Input/Output System (BIOS) or a Network Interface Card (NIC) controller.

3. The IHS of claim 1, wherein the WOA packet is received over a computer network.

4. The IHS of claim 1, wherein the second power state consumes more power than the first power state.

5. The IHS of claim 1, wherein the WOA packet includes a WOA string following the one or more instances of the MAC address.

6. The IHS of claim 1, wherein the WOA string includes a public encryption key, and wherein the program instructions, upon execution by the logic circuit, further cause the IHS use the public encryption key to decode the identification.

7. The IHS of claim 6, wherein the WOA packet includes, program instructions, upon execution by the logic circuit, further cause the IHS to initiate a communication with the receiving application.

8. The IHS of claim 7, wherein the receiving application resides in an originating IHS distinct from the IHS, the originating IHS having originated the WOA packet.

9. The IHS of claim 7, wherein the receiving application resides in another IHS distinct from the IHS, and the other IHS is distinct from the IHS and from an originating IHS, the originating IHS having originated the WOA packet.

10. A method, comprising:
receiving, at an Information Handling System (IHS), a single Wake on Application (WOA) frame while the IHS operates in a first power state, wherein the single WOA frame identifies a software application residing within the IHS, and wherein the single WOA frame includes: (i) a Wake on LAN (WOL) string followed by one or more instances of a Media Access Control (MAC) address associated with the IHS, (ii) a WOA string following the one or more instances of the MAC address, (iii) an identification of the software application selected from the group consisting of: an Internet Protocol (IP) address, a virtual MAC address, and a global application tag, (iv) an identification of a receiving software application residing in another IHS other than the IHS to communicate with the identified software application, and (v) an identification of a port through which the identified software application is to establish communications with the receiving software application; and
in response to having received the WOA packet, operate in a second power state and launch the software application.

11. The method of claim 10, wherein the first WOA packet includes a Wake on LAN (WOL) string followed by one or more instances of a Media Access Control (MAC) address associated with a second IHS, and wherein the second WOA packet includes a WOL string followed by one or more instances of a MAC address associated with a third IHS.

12. A non-transitory computer-readable medium having program instructions stored thereon that, upon execution by an Information Handling System (IHS), cause the IHS to:
receive a single Wake on Application (WOA) frame while the IHS operates in a first power state, wherein the single WOA frame identifies a software application residing within the IHS, and wherein the single WOA frame includes: (i) a Wake on LAN (WOL) string followed by one or more instances of a Media Access Control (MAC) address associated with the IHS, (ii) a WOA string following the one or more instances of the MAC address, (iii) an identification of the software application selected from the group consisting of: an Internet Protocol (IP) address, a virtual MAC address, and a global application tag, (iv) an identification of a receiving software application residing in another IHS other than the IHS to communicate with the identified software application, and (v) an identification of a port through which the identified software application is to establish communications with the receiving software application; and
in response to having received the WOA packet, operate in a second power state and launch the software application.

* * * * *